United States Patent [19]

Blum

[11] 4,155,959

[45] May 22, 1979

[54] APPARATUS FOR THE REMOVAL OF GASES, ESPECIALLY AIR, IN FLUIDS

[76] Inventor: Albert Blum, Scheiderhohe, 5204 Lohmar (Rhld.) 1, Fed. Rep. of Germany

[21] Appl. No.: 737,399

[22] Filed: Nov. 1, 1976

[30] Foreign Application Priority Data

Oct. 31, 1975 [DE] Fed. Rep. of Germany ....... 2548754

[51] Int. Cl.[2] ............................................. B01F 3/04

[52] U.S. Cl. ...................................... 261/93; 210/220; 261/36 R; 261/DIG. 75; 415/207; 417/84

[58] Field of Search .................... 261/28, 29, 34 R, 91, 261/36 R, 76, 87, 93, DIG. 75, 121 M, 77; 210/219, 220, 221 M; 209/169; 417/76, 84; 415/204, 206, 207

[56] References Cited

U.S. PATENT DOCUMENTS

| | | | |
|---|---|---|---|
| 1,148,992 | 8/1915 | Seaver, Jr. | 417/84 |
| 1,203,841 | 11/1916 | Bancel | 417/84 |
| 1,598,858 | 9/1926 | Greenawalt | 261/77 |
| 2,393,976 | 2/1946 | Daman et al. | 261/93 X |
| 2,791,968 | 5/1957 | Rupp | 417/84 X |
| 2,863,653 | 12/1958 | Cummings | 261/93 X |
| 3,355,106 | 11/1967 | Graham | 261/93 X |
| 3,490,996 | 1/1970 | Kelly, Jr. | 261/93 X |
| 3,663,117 | 5/1972 | Warren | 261/DIG. 75 |
| 3,829,068 | 8/1974 | Hohne | 261/36 R |
| 3,904,393 | 9/1975 | Morse | 261/DIG. 75 |

FOREIGN PATENT DOCUMENTS

| | | | |
|---|---|---|---|
| 197338 | 4/1958 | Austria | 261/93 |
| 942211 | 4/1956 | Fed. Rep. of Germany | 261/93 |
| 2516371 | 10/1975 | Fed. Rep. of Germany | 261/DIG. 75 |
| 16099 of | 1889 | United Kingdom | 261/29 |
| 819785 | 9/1959 | United Kingdom | 261/93 |

*Primary Examiner*—Richard L. Chiesa

*Attorney, Agent, or Firm*—Diller, Ramik & Wight

[57] ABSTRACT

The disclosure is of a device comprising a submersible electric motor-pump assembly, a substantially annular inner chamber closely surrounding said pump and connected to the delivery thereof, a substantially annular outer chamber surrounding said inner chamber, an air supply conduit connected to said outer chamber, and a plurality of nozzle elements constituting ejector nozzles in the boundaries of said inner chamber and said outer chamber whereby liquid escapes from said inner chamber and entrains air from said outer chamber and is discharged in the form of aerating jets.

2 Claims, 2 Drawing Figures

161
16
162
164
122
163
17
12
164
163
121

APPARATUS FOR THE REMOVAL OF GASES, ESPECIALLY AIR, IN FLUIDS

INTRODUCTION AND BACKGROUND OF THE INVENTION

This invention relates to a device for the introduction of gaseous medium such as air into liquid such as drain water, the device being of the kind which withdraws a portion of the liquid to be aerated and discharges it under pressure through at least one nozzle element by which the liquid passes through a space filled with air of which part is entrained in an ejector nozzle through which these mixed portions of the liquid and air are returned into the fluid to be aerated.

There are known radiating aerators of this kind in which the liquid is passed under pressure into an inner chamber from which it is discharged through nozzle elements arranged spaced and angularly displaced in relation to one another into an outer chamber surrounding the inner chamber, the outer chamber being connected to an air supply conduit and having nozzle elements arranged to be complementary to the nozzle elements of the inner chamber, whereby the outer chamber nozzle elements receive the liquid jets from the inner chamber nozzle elements and return the liquid with entrained air into the bulk of the liquid to be aerated.

These so-called radiating aerators must, however, be supplied with both the air and the liquid through special pumps or compressors, which may be mounted within or externally of the bulk of the liquid and must be connected through appropriate connection conduits to the radiating aerators.

One object of the invention is to provide a simplified form of construction in which there are substantially avoided not only the connection conduits between the radiating aerator and the pump or compressor and the appertaining costs of mounting the same, but in which also there can be used the very convenient pumps or motor-pump assemblies which are known as submersible pumps or as submersible motor-pump assemblies comprising electric motors and pumps connected therewith, in order thereby to furnish very effective aerating devices in a simple manner.

BRIEF SUMMARY OF THE INVENTION

For this purpose, in a radiating aerator of the initially mentioned kind, with an inner pressure chamber connectable to the pressure delivery outlet of a pump, and a second outer air chamber surrounding the pressure chamber and connectable to an air supply conduit, in the walls of which chambers distributed in angularly displaced manner and spaced from one another there are arranged nozzle elements, the invention provides that the inner pressure chamber is formed as an annular or substantially annular chamber into the central opening of which can be inserted the propelling pump. In this connection it is recommended to select the arrangement and the dimensions so that the delivery outlet of the propelling pump can be connected directly to the inlet of the pressure chamber.

FURTHER DESCRIPTION AND ADVANTAGES OF THE INVENTION

In favourable circumstances the delivery outlet of the pump can be coupled directly by means of its coupling flange directly to the inlet of the pressure chamber. However, usually in each instance it will be possible to effect the connection of the pump pressure delivery outlet and the pressure chamber of the radiating aerator with simple fastening elements.

In many instances it is convenient to suit the inner periphery of the central opening of the aerator to the outer periphery of the pump housing, and in some instances the boundary of the central opening in the aerator can be formed to constitute the pump housing in which can be mounted merely the pump impeller wheel connected to the shaft of the driving motor.

In a particularly favourable construction the device comprises a submersible electric motor-pump assembly, a substantially annular inner chamber closely surrounding said pump and connected to the delivery thereof, a substantially annular outer chamber surrounding said inner chamber, an air supply conduit connected to said outer chamber, and a plurality of nozzle elements constituting ejector nozzles in the boundaries of said inner chamber and said outer chamber whereby liquid escapes from said inner chamber and entrains air from said outer chamber and is discharged in the form of aerating jets.

The invention permits many possibilities of embodiment. In the accompanying drawings there is illustrated one embodiment of a device in accordance with the invention, somewhat diagrammatically and showing those parts which are important for the comprehension of the invention.

BRIEF DESCRIPTION OF THE VIEWS IN THE DRAWINGS

In the accompanying drawings:

FIG. 1 shows one form of embodiment of an aerating device in accordance with the invention in operation in a drain water tank, and FIG. 2 shows a view in section appproximately on the line 2—2 in FIG. 1.

DETAILED DESCRIPTION OF THE PREFERRED EMBODIMENTS

Figure 1:
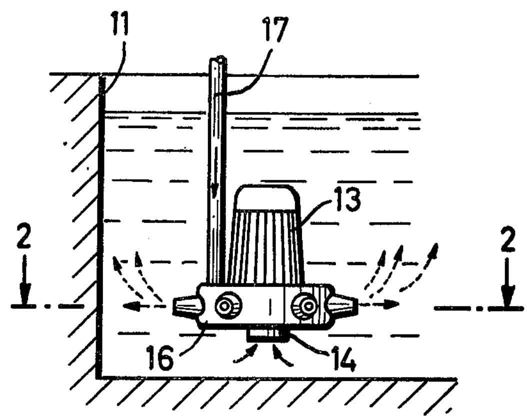
Figure 2:
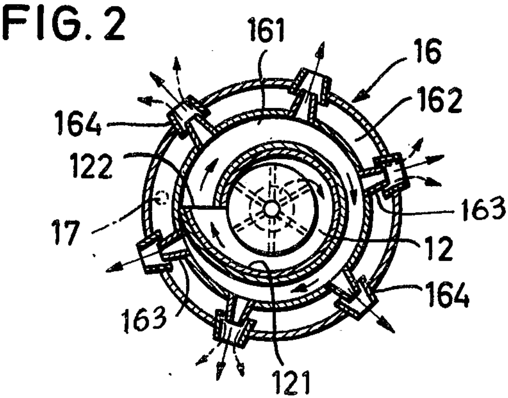

With reference to the aerating device shown in very schematic manner in FIG. 1, which device serves for the aeration of drain water in a drain water tank 11, there will be explained the manner of operation and construction of the device. With the aid of a pump 12 (FIG. 2) which is driven by an electric motor 13 and forms therewith a submersible motor-pump assembly, a portion of the drain water liquid is sucked in through a suction intake 14. The motor-pump assembly formed of the electric motor 13 and the pump 12 is completely submersible in the liquid medium to be impelled. The pump 12 has a spiral pump housing 121, which is surrounded by an aerator 16. In the illustrated example of the embodiment the aerator 16 has a central opening of which the inner periphery is suited to the outer periphery of the pump housing 121, so that this latter can be mounted without difficulty in the central opening of the annular aerator 16.

The pressure delivery outlet 122 of the pump housing 121 is directly in connection with the inlet of an inner substantially annular first chamber 161 serving as the pressure chamber of the aerator 16. From the pressure chamber 161 the impelled liquid medium arrives at inner nozzle elements 163, which are shown as individual nozzle elements mounted in the wall of the chamber 161 but which could be constituted by one or more nozzle slots or openings in this wall. From the nozzle elements 163 the impelled liquid medium is ejected in the form of jets which pass through an outer second air chamber 162, which is in connection with an air supply conduit 17. After passing through the air chamber 162 the liquid jets ejected radially from the nozzle elements 163 are received by entraining nozzle elements 164 which are provided in the outer wall of the annular air chamber 162. There is one nozzle element 163 respective to each nozzle element 164 in order to constitute a plurality of effective ejector nozzles from which the impelled liquid together with the entrained air is returned into the bulk of the drain water in the tank 11.

What is claimed is:

1. An aerator device comprising a generally closed housing including an outer wall, an inner wall, and an intermediate wall, said inner wall defining a pump receiving opening, said intermediate wall surrounding said inner wall in spaced relationship thereto and together with said inner wall defining a liquid receiving inner pressure chamber having an inlet opening generally circumferentially thereinto from said pump receiving opening, said inner pressure chamber defining a generally circumferential flow path for liquid converging in a direction away from said inlet opening, said outer wall surrounding said intermediate wall in spaced relationship thereto and together with said intermediate wall defining an outer chamber for receiving air, said inner, outer and intermediate walls being stationary, means for conducting air into said outer chamber, generally aligned ejector nozzles in said intermediate and outer walls providing means for liquid to escape from said inner chamber and to entrain air from said outer chamber and discharge liquid and entrained air from said outer chamber in the form of aerating jets, said pump receiving opening being of a size and cross-section for having directly seated therein a conventional pump of the type having a motor attached.

2. The aerator device of claim 1 wherein a separately formed pump is seated in said pump receiving opening.

* * * * *